US012741812B2

(12) United States Patent
Lie et al.

(10) Patent No.: US 12,741,812 B2
(45) Date of Patent: Sep. 22, 2026

(54) SYSTEM AND METHOD FOR USING A CAMERA TO DETECT ROBOT POSITION ON GRID

(71) Applicant: Autostore Technology AS, Nedre Vats (NO)

(72) Inventors: Bjørnar Berge Lie, Avaldsnes (NO); Jonas Lægreid Haldorsen, Rubbestadneset (NO)

(73) Assignee: AutoStore Technology AS, Nedre Vats (NO)

( * ) Notice: Subject to any disclaimer, the term of this patent is extended or adjusted under 35 U.S.C. 154(b) by 489 days.

(21) Appl. No.: 18/262,834

(22) PCT Filed: Jan. 28, 2022

(86) PCT No.: PCT/EP2022/052026
§ 371 (c)(1),
(2) Date: Jul. 25, 2023

(87) PCT Pub. No.: WO2022/162134
PCT Pub. Date: Aug. 4, 2022

(65) Prior Publication Data
US 2024/0417168 A1 Dec. 19, 2024

(30) Foreign Application Priority Data
Jan. 29, 2021 (NO) .................................... 20210117

(51) Int. Cl.
*B65G 1/04* (2006.01)
*B65G 43/00* (2006.01)
*B65G 1/02* (2006.01)

(52) U.S. Cl.
CPC ............. *B65G 1/0464* (2013.01); *B65G 1/04* (2013.01); *B65G 1/0478* (2013.01); *B65G 43/00* (2013.01);
(Continued)

(58) Field of Classification Search
CPC .......... B65G 1/0464; B65G 2203/0283; B65G 2203/041; B65G 43/00; B65G 1/0478; B65G 1/02; B65G 1/04
See application file for complete search history.

(56) References Cited

U.S. PATENT DOCUMENTS

2010/0274390 A1* 10/2010 Walser .................. B25J 9/1697 700/259
2015/0307276 A1* 10/2015 Hognaland .......... B65G 1/0407
(Continued)

FOREIGN PATENT DOCUMENTS

CA 2824606 A1 * 7/2012 ............. B25J 19/02
CN 106794852 A 5/2017
(Continued)

OTHER PUBLICATIONS

Qiu, Feng, Office Action in CN202280012470.2, mailed Jun. 25, 2025, 16 pages, The State Intellectual Property Office of the People's Republic of China, Beijing, China.
(Continued)

*Primary Examiner* — Ernesto A Suarez
*Assistant Examiner* — Laurence R Brothers
(74) *Attorney, Agent, or Firm* — Baker Botts L.L.P.

(57) ABSTRACT

A system tracks the position of a container handling vehicle on a grid, following a route relative to rails on a frame structure forming a storage grid. The vehicle has first and second sets of wheels connected to drives for moving the vehicle in corresponding x- and y-directions on the grid. The vehicle receives information of number of rails to pass between start and stop positions in x- and y-directions according to the route from a central computer system. The container handling vehicle has at least one camera mounted underneath to film downwards while the container handling vehicle is in motion, a computer system with an image processing algorithm to process the transferred images and
(Continued)

detect the rails in the images, and the camera is positioned so as to be able to capture at least one rail in the x-direction and one rail in the y-direction while the container handling vehicle is positioned over a column.

8 Claims, 6 Drawing Sheets

(52) U.S. Cl.
CPC ................ *B65G 2203/0283* (2013.01); *B65G 2203/041* (2013.01)

(56) References Cited

U.S. PATENT DOCUMENTS

| | | | | |
|---|---|---|---|---|
| 2020/0399060 | A1* | 12/2020 | Whelan | G05D 1/0246 |
| 2021/0032034 | A1* | 2/2021 | Kalouche | B25J 9/1612 |

FOREIGN PATENT DOCUMENTS

| | | | | |
|---|---|---|---|---|
| CN | 108491758 | A | 9/2018 | |
| EP | 3 535 634 | B1 | 7/2020 | |
| NO | 317366 | B1 | 10/2004 | |
| WO | 2014/075937 | A1 | 5/2014 | |
| WO | 2014/090684 | A1 | 6/2014 | |
| WO | 2015/193278 | A1 | 12/2015 | |
| WO | 2019/170805 | A1 | 9/2019 | |
| WO | WO-2019206440 | A1 * | 10/2019 | B65G 1/0464 |
| WO | WO-2019232651 | A1 * | 12/2019 | B65G 1/0492 |

OTHER PUBLICATIONS

Office Action issued in counterpart Norwegian Patent Application No. 20210117 mailed on Aug. 18, 2021 (2 pages).
International Search Report issued in corresponding International Application No. PCT/EP2022/052026, mailed on Apr. 25, 2022 (4 pages).
Written Opinion issued in corresponding International Application No. PCT/EP2022/052026, mailed on Apr. 25, 2022 (9 pages).
International Preliminary Report on Patentability issued in corresponding International Application No. PCT/EP2022/052026, mailed on Feb. 8, 2023 (14 pages).
Qiu, Feng, Office Action in CN202280012470.2, mailed Dec. 3, 2025, 14 pages, The State Intellectual Property Office of the People's Republic of China, Beijing, China.
Bijing. "Smart environment sensing technology of an autonomous unmanned system." Wuhan, China University of Science and Technology Press (2020): 96-99, Wuhan, China.
Qiu, Feng, Office Action in CN202280012470.2, mailed Mar. 27, 2026, 18 pages, The State Intellectual Property Office of the People's Republic of China, Beijing, China.
Moreno Rey, Marcos, Office Action in European Patent Office patent application 22702940.2, mailed Jun. 23, 2026, 6 pages, European Patent Office, Munich, Germany.

* cited by examiner

SYSTEM AND METHOD FOR USING A CAMERA TO DETECT ROBOT POSITION ON GRID

The present invention relates to an automated storage and retrieval system for storage and retrieval of containers, in particular to a method for measuring the exact position of a container handling vehicle on a grid.

BACKGROUND AND PRIOR ART

FIG. 1 discloses a typical prior art automated storage and retrieval system 1 with a framework structure 100 and FIGS. 2 and 3 discloses two different prior art container handling vehicles 201, 301 suitable for operating on such a system 1.

The framework structure 100 comprises a number of upright members 102 and a number of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. In this way, the rail system 108 defines grid columns 112 above which the container handling vehicles 201, 301 can move laterally above the storage columns 105, i.e. in a plane which is parallel to the horizontal X-Y plane.

A control system 500 of the automated storage and retrieval system 1 is shown in communication with the vehicles 200, 300.

Each prior art container handling vehicle 201, 301 comprises a vehicle body 201*a*, 301*a*, and first and second sets of wheels 201*b*, 301*b*, 201*c*, 301*c* which enable the lateral movement of the container handling vehicles 201, 301 in the X direction and in the Y direction, respectively. In FIGS. 2 and 3 two wheels in each set are fully visible. The first set of wheels 201*b*, 301*b* is arranged to engage with two adjacent rails of the first set 110 of rails, and the second set of wheels 201*c*, 301*c* is arranged to engage with two adjacent rails of the second set 111 of rails. Each set of wheels 201*b*, 301*b* 201*c*, 301*c* can be lifted and lowered, so that the first set of wheels 201*b*, 301*b* and/or the second set of wheels 201*c*, 301*c* can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid disclosed in FIG. 1, Z=8 identifies the lowermost, bottom layer of the grid 104. Similarly, X=1 . . . n and Y=1 . . . n identifies the position of each grid column 112 in the horizontal plane. Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 201, 301 can be said to travel in layer Z=0, and each grid column 112 can be identified by its X and Y coordinates.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201*a* as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

The rail system 108 may be a single rail system, as is shown in FIG. 4. Alternatively, the rail system 108 may be a double rail system, as is shown in FIG. 5, thus allowing a container handling vehicle 201 having a footprint generally corresponding to the lateral area defined by a grid column 112 to travel along a row of grid columns even if another container handling vehicle 201 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of tracks 110*a*, 110*b* of the first tracks 110 and a pair of tracks 111*a*, 111*b* of the second set of tracks 111. In FIG. 5 the grid cell 122 is indicated by a dashed box.

Consequently, tracks 110*a* and 110*b* form pairs of tracks defining parallel rows of grid cells running in the X direction, and tracks 111*a* and 111*b* form pairs of tracks defining parallel rows of grid cells running in the Y direction.

As shown in FIG. 6, each grid cell 122 has a width Wc which is typically within the interval of 30 to 150 cm, and a length Lc which is typically within the interval of 50 to 200 cm. Each grid opening 115 has a width Wo and a length Lo which is typically 2 to 10 cm less than the width Wc and the length Lc of the grid cell 122.

In the X and Y directions, neighboring grid cells are arranged in contact with each other such that there is no space there-between.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119, 120 for further transportation to an access station. Note that the term 'tilted' means transportation of storage containers 106 having a general transportation orientation somewhere between horizontal and vertical.

The grid 104 in FIG. 1 comprises two port columns 119 and 120. The first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301 can pick up storage containers 106 that have been transported to the grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 119, 120 and the access station.

If the ports 119, 120 and the access station are located at different levels, the conveyor system may comprise a lift device with a vertical component for transporting the storage containers 106 vertically between the port 119, 120 and the access station.

The conveyor system may be arranged to transfer storage containers 106 between different grids, e.g. as is described in WO2014/075937A1, the contents of which are incorporated herein by reference.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301 to a grid location above the storage column 105 in which the target storage container 106 is positioned, retrieving the storage container 106 from the storage column 105 using the container handling vehicle's 201, 301 lifting device (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201, 301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201, 301 so that a desired storage container 106 can be delivered to the desired location at the desired time without the container handling vehicles 201, 301 colliding with each other, the automated storage and retrieval system 1 comprises a control system which typically is computerized and which typically comprises a database for keeping track of the storage containers 106.

When a container handling vehicle needs to change tracks there is a danger of the wheels missing the tracks due to the container handling vehicle not being in the exact correct position. If the container handling vehicle is off just by a few millimeters, there is a distinct possibility that the wheels lowered down onto the rails can miss their tracks. If a container handling vehicle misses its tracks it can lead to down time of the entire grid while fixing the problem or it can lead to collisions.

It is known to use e.g. a proximity sensor to detect when the robot passes the grid structure. A proximity sensor emits light and measures how much light is reflected back to the sensor. A problem with this solution is that the sensor is vulnerable to dust on the lens, dirt and debris on the tracks or even reflective merchandise stored in the containers in the grid cells. This can lead to a false positive reading or a false negative reading which will result in the container handling vehicle missing its tracks.

SUMMARY OF THE INVENTION

The present invention is set forth and characterized in the independent claims, while the dependent claims describe other characteristics of the invention.

In one aspect, the invention is related to a system for tracking the position of a container handling vehicle on a grid, following a set route relative to rails laid out on a frame structure forming a storage grid, the vehicle having first and second sets of wheels connected to drives for moving the vehicle in corresponding x- and y-directions on the grid, said vehicle comprises means for receiving information of number of rail crossings to pass between start and stop positions in x- and y-directions according to the set route from a central computer system, wherein that the container handling vehicle has at least one camera mounted underneath filming downwards while the container handling vehicle is in motion and means for transmitting the images to a computer system with an image processing algorithm to process the transferred images and detecting the rail crossings in the images.

Further, the at least one camera can be a 3D time-of-flight camera, also two or more cameras can be positioned underneath of the container handling vehicle filming downwards while the container handling vehicle is in motion and the two or more cameras are pointing in different directions.

In a second aspect the invention is directed to a method for tracking the position of a container handling vehicle following a set route relative to rails laid out on a frame structure forming a storage grid, the vehicle having first and second sets of wheels connected to drives for moving the vehicle in corresponding x- and y-directions on the grid, comprising:

- receiving information of a total number of rail crossings to pass between start and stop positions in x- and y-directions according to the set route
- detecting and monitoring rail crossings passed when moving the vehicle in the x- and y-directions according to the set route by means of filming downwards using at least one camera mounted underneath a container handling vehicle while the container is in motion,
- transmitting the images to a computer system,
- using an image processing algorithm to process the transferred images,
- detecting the rails in the images,
- inferring the position of the container handling vehicle on the basis of the detection of the rails in the images.

Using a 3D time of flight camera positioned underneath the container handling vehicle in order to detect the position of the container handling vehicle on the grid.

Using two or more cameras to accurately detect the position of the container handling vehicle on the grid.

Filming underneath the container handling vehicle in two or more directions using two or more cameras.

Transmitting the images to either/or a central computer system or a computer system located on the container handling vehicle.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
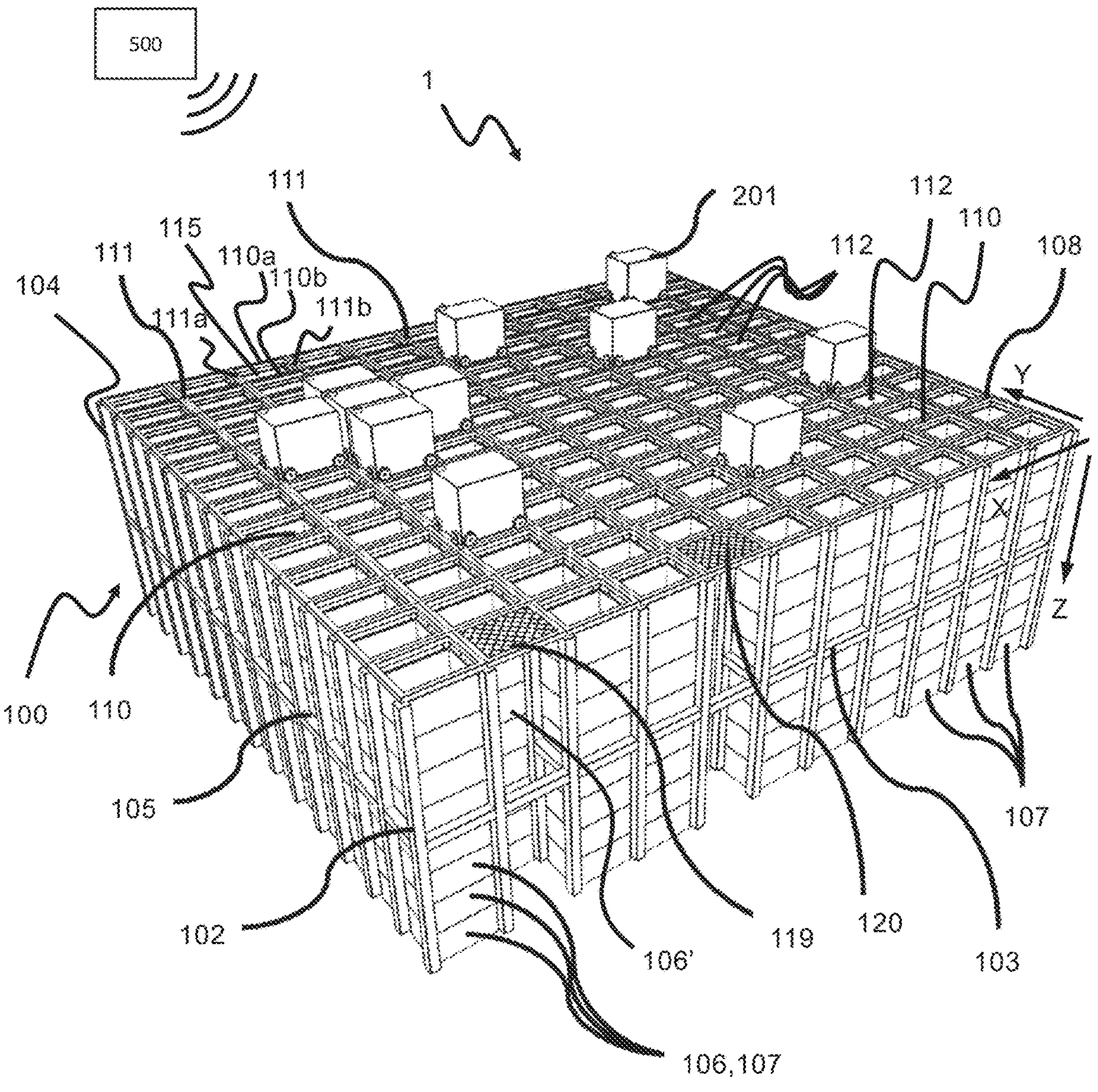
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
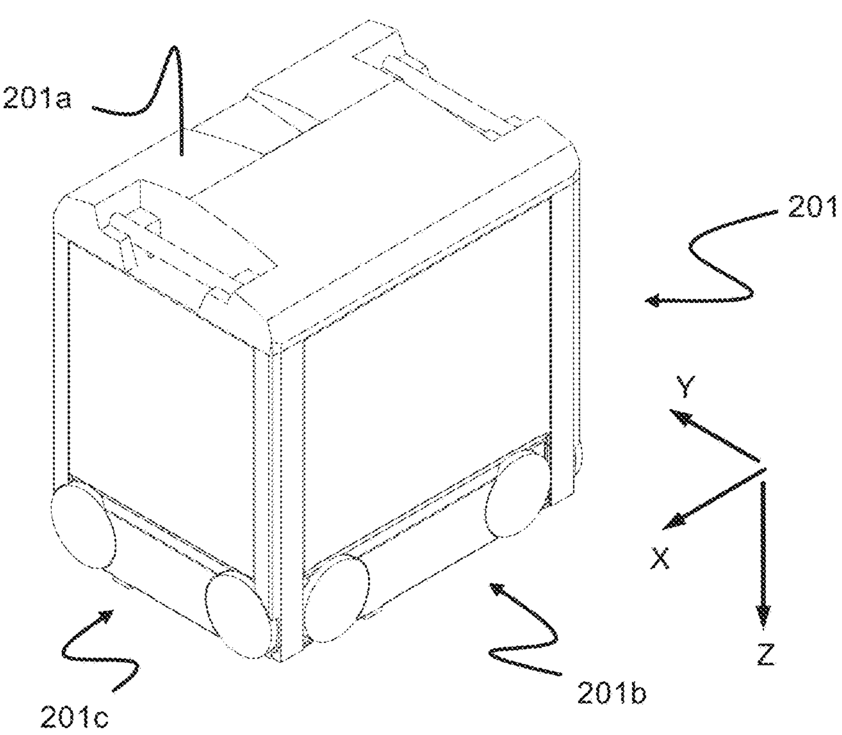
FIG. 2 is a perspective view of a prior art container handling vehicle having a centrally arranged cavity for carrying storage containers therein.
Figure 3:
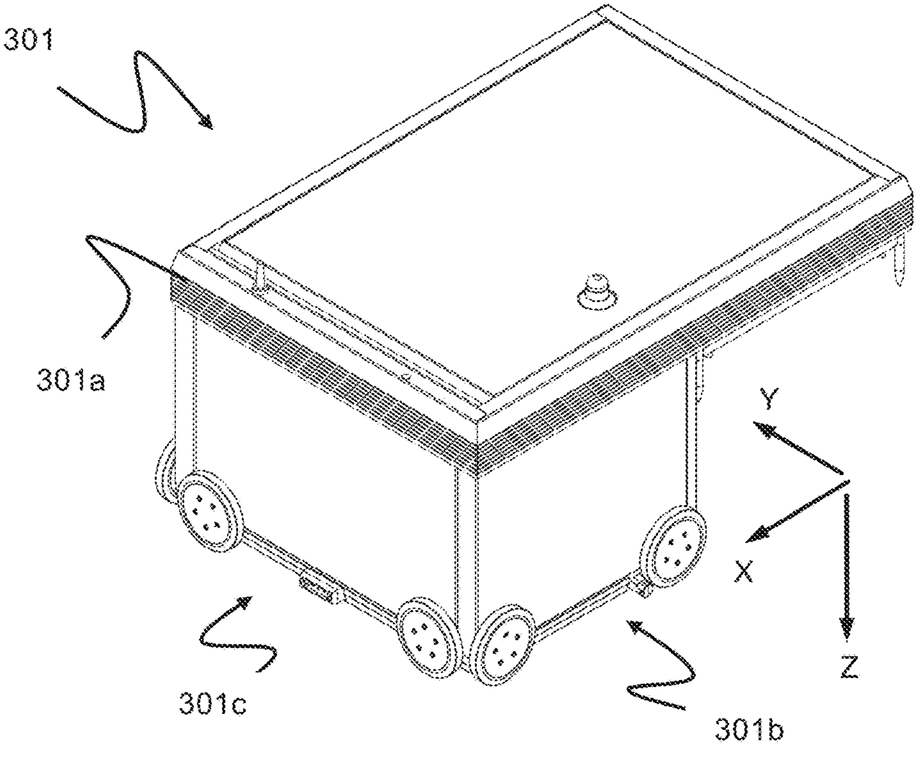
FIG. 3 is a perspective view of a prior art container handling vehicle having a cantilever for carrying storage containers underneath.
Figure 4:
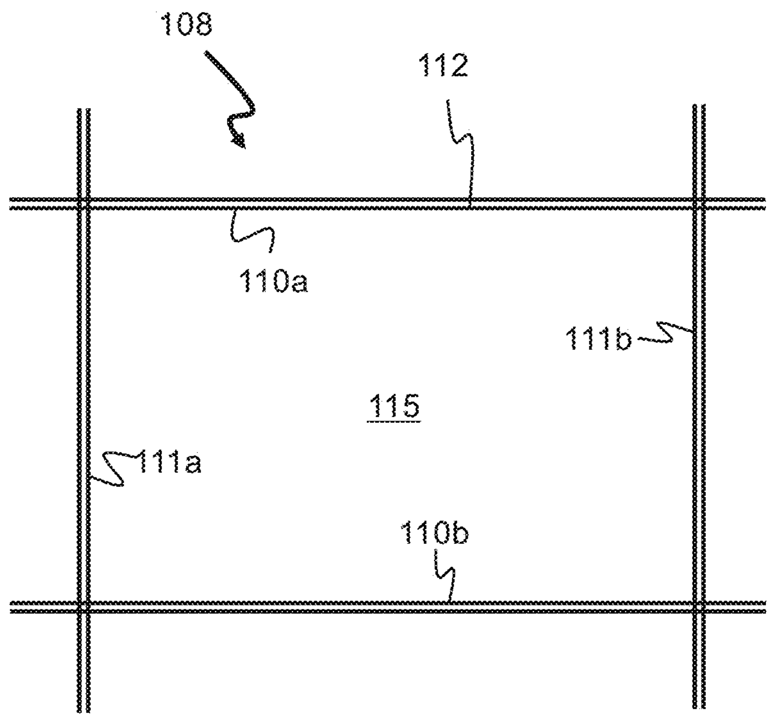
FIG. 4 a top view of a column showing a single rail system in the X-direction and in the Y direction.
Figure 5:
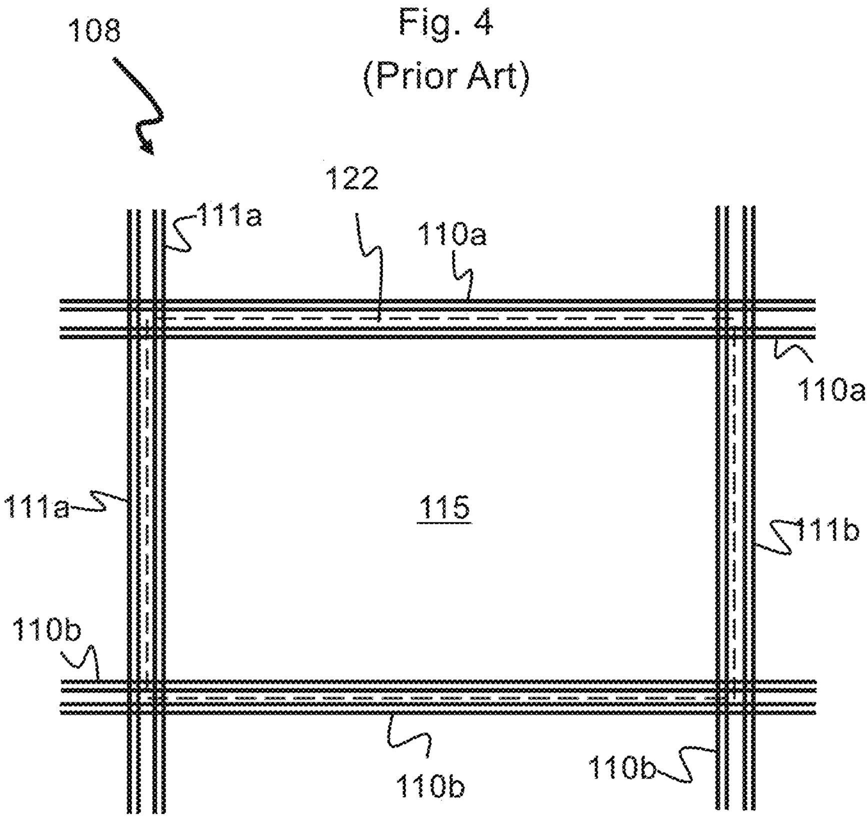
FIG. 5 is a top view of a column showing two rails in the X-direction and two rails in the Y direction.
Figure 6:
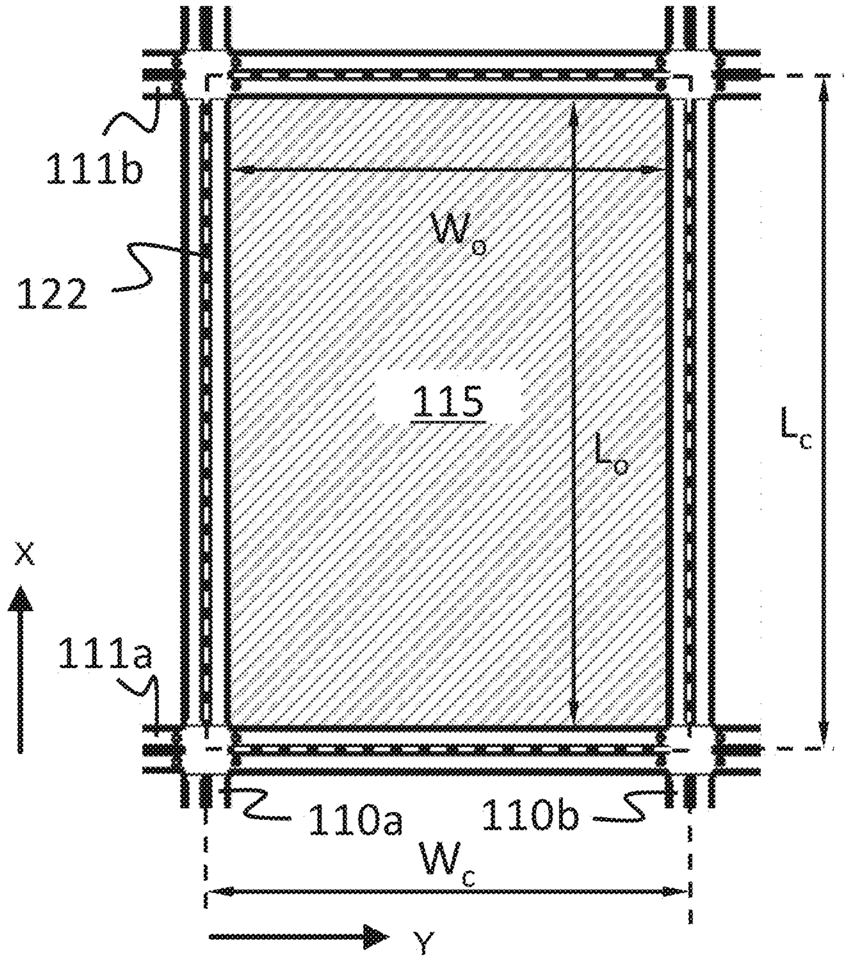
FIG. 6 is a top view of a grid cell.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 7:
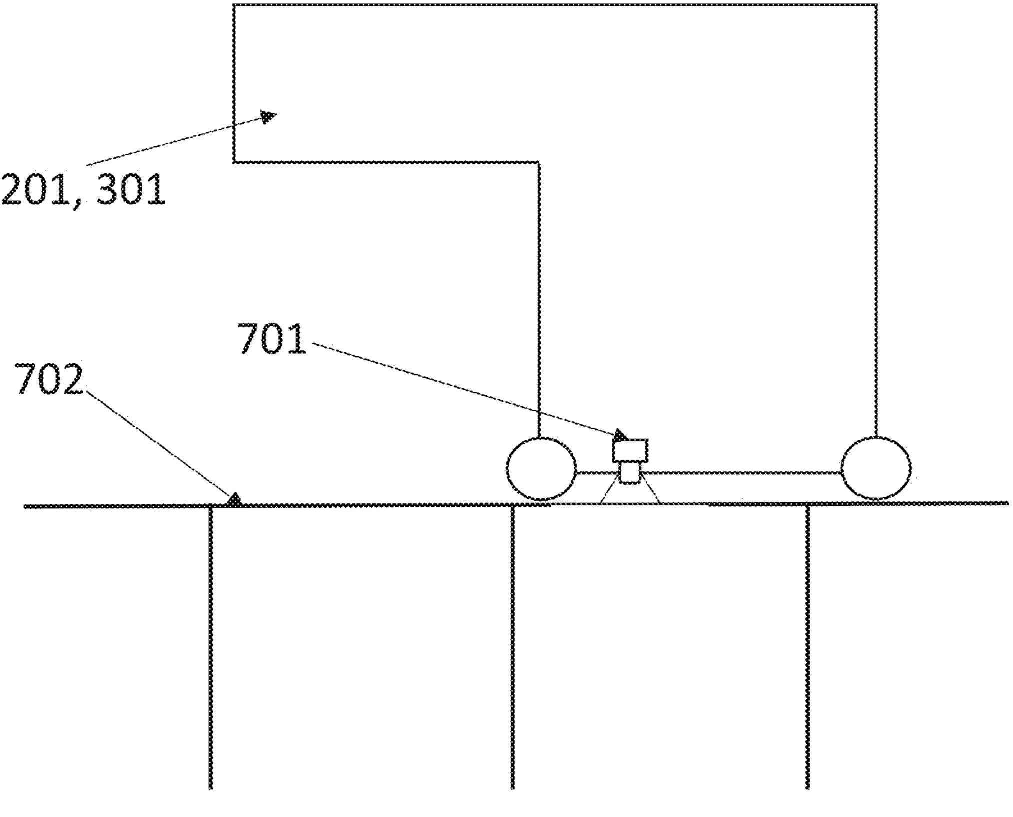
FIG. 7 is a side view illustration of a container handling vehicle with a camera mounted underneath for tracking the position of the container handling vehicle.

FIG. 7 is a side view illustration of a container handling vehicle with a camera mounted underneath for tracking the position of the container handling vehicle.

The image displays a side view of a container handling vehicle positioned over a column on a grid. Although the illustration is of a container handling vehicle with a cantilever solution, the invention is just as suitable on a central cavity robot as displayed in FIG. 2. In the image the camera is displayed mounted on the underside of the container handling vehicle. The camera is mounted with the lens pointing downwards.

By using a camera attached to the underside of the container handling vehicle and pointing the camera downwards and filming at least while the container handling vehicle is in motion, it is possible to find out exactly where the container handling vehicle is. When the container handling vehicle moves over the grid, the horizontal members 103 will pass through the field of vision of the camera and record the position of the horizontal members in every image frame. The images from the camera is transferred to a computer. In an embodiment of the present invention the computer can be on the container handling vehicle. In another embodiment the computer can be a central computer system. The computer uses an image processing algorithm to find the horizontal members in the picture frame. From the position of horizontal members in the picture frame, the position of the container handling vehicle is inferred.

The computer can therefor exactly know where the container handling vehicle is on the grid by counting the number of horizontal members that has passed through the images. The computer can also detect which way the container handling vehicle is moving by analyzing in which direction the horizontal members is moving through the image. In order to determine exactly where a container handling vehicle should stop the computer system calculates where in the frame the horizontal members should be. Also, the computer system can calculate how far off the exact spot the container handling vehicle is by calculating how far off the edge of the grid is from where it should be in the image. The computer system can tell the container handling vehicle to move a given distance in either direction in order to be positioned perfectly for the task it is given to perform.

Figure 8:
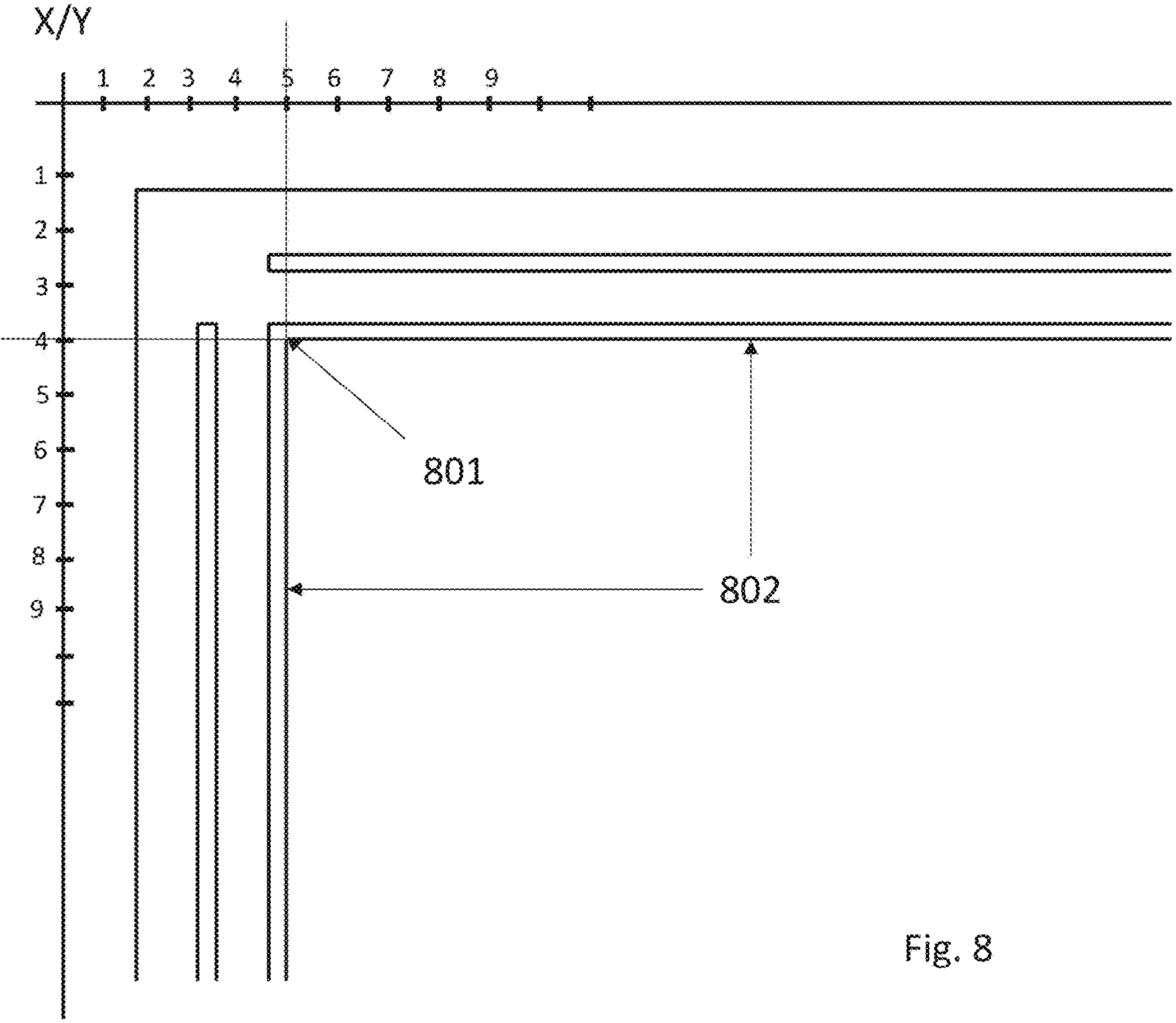
FIG. 8 is a partial top view of the corner of a cell in a grid.

FIG. 8 shows the edges 801 which are detected in a picture taken by the camera mounted underneath the container handling vehicle. from the position of the grid in the picture the position of the horizontal members. in the picture, the position of the robot is inferred. It is shown an image of the horizontal members which are detected in a picture. The detection point 802 is at coordinates (4, 5) with respect to the zero-point of the camera.

This method improves the quality of the estimation of the container handling vehicle. This method will be more robust to dust, dirt on the tracks and objects in the grid cells. Since the camera is located under the container handling vehicle it is also protected during handling of the container handling vehicle.

Alternatively, there can be used a 3D time-of-flight camera which will provide extra information for the detection algorithm to work with which can produce more robust results. The time-of-flight camera sends out light which makes the camera less affected by changing light conditions. Moreover, using the 3D time-of-flight camera, the time-of-flight of the light pulse is less susceptible to dirt on the tracks, or reflective objects in the grid cells.

In an alternative embodiment of the present invention, there can be mounted two or more cameras to the bottom of a container handling vehicle. The cameras can be pointing is different directions in order to make the detection of the grids in the images processed by the algorithm in the computer system even easier.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIGS. 1-4)

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110*a* First rail in first direction (X)
110*b* Second rail in first direction (X)
111 Parallel rail in second direction (Y)
111*a* First rail of second direction (Y)
111*b* Second rail of second direction (Y)
112 Access opening
115 Grid opening
119 First port column
120 Second port column
122 Grid cell
201 Prior art container handling vehicle
201*a* Vehicle body of the container handling vehicle 201
201*b* Drive means/wheel arrangement, first direction (X)
201*c* Drive means/wheel arrangement, second direction (Y)
301 Prior art cantilever container handling vehicle
301*a* Vehicle body of the container handling vehicle 301
301*b* Drive means in first direction (X)
301*c* Drive means in second direction (Y)
304 Gripping device
500 Control system
701 Camera
702 Grid
801 Grid edge
802 Grid edge detection point.
X First direction
Y Second direction
Z Third direction

The invention claimed is:

1. A system for tracking the position of a container handling vehicle on a grid, following a route relative to rails on a frame structure forming a storage grid, the vehicle having first and second sets of wheels connected to drives for moving the vehicle in corresponding x- and y-directions on the grid, said vehicle comprises a vehicle computer configured for receiving information of number of rails to pass between start and stop positions in x- and y-directions according to the route from a central computer system, wherein the container handling vehicle has at least one camera mounted underneath to film downwards while the container handling vehicle is in motion, and wherein the at least one camera is a 3D time-of-flight camera, a computer system with an image processing algorithm to process images from the camera and detect the rails in the images, and the camera is positioned so as to be able to capture at least one rail in the x-direction and one rail in the y-direction while the container handling vehicle is positioned over a column.

2. The system according claim 1, wherein two or more cameras are positioned underneath of the container handling vehicle to film downwards while the container handling vehicle is in motion.

3. The system according to claim 1, wherein the two or more cameras are pointing in different directions.

4. A method for tracking the position of a container handling vehicle following a route relative to rails laid out on a frame structure forming a storage grid, the vehicle having first and second sets of wheels connected to drives for moving the vehicle in corresponding x- and y-directions on the grid, comprising:

receiving information of a total number of rails to pass between start and stop positions in x- and y-directions according to the set route, detecting and monitoring rails passed when moving the vehicle in the x- and y-directions according to the route by means of filming downwards using at least one camera mounted underneath the container handling vehicle while the container handling vehicle is in motion, wherein the at least one camera is a 3D time-of-flight camera, positioning the camera so as to be able to capture at least one rail in the x-direction and one rail in the y-direction while the container handling vehicle is positioned over a column, transmitting the images to a computer system, using an image processing algorithm to process the transferred images, detecting the rails in the images, inferring the position of the container handling vehicle on the basis of the detection of the rails in the images.

5. The method according to claim 4 using the 3D time of flight camera positioned underneath the container handling vehicle in order to detect the position of the container handling vehicle on the grid.

6. The method according to claim 4 using two or more cameras to detect the position of the container handling vehicle on the grid.

7. The method according to claim 4 filming underneath the container handling vehicle in two or more directions using two or more cameras.

8. The method according to claim 4 transmitting the images to either/or a central computer system or a computer system located on the container handling vehicle.

* * * * *